(12) United States Patent
Ploucha et al.

(10) Patent No.: US 11,420,656 B2
(45) Date of Patent: Aug. 23, 2022

(54) SECURITY SYSTEM AND METHOD FOR DISABLING VEHICLE FUNCTIONS

(71) Applicant: GM GLOBAL TECHNOLOGY OPERATIONS LLC, Detroit, MI (US)

(72) Inventors: Joseph E. Ploucha, Commerce Township, MI (US); Kevin M. Baltes, Wixom, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 95 days.

(21) Appl. No.: 16/927,230

(22) Filed: Jul. 13, 2020

(65) Prior Publication Data
US 2022/0009523 A1 Jan. 13, 2022

(51) Int. Cl.
*B60W 30/14* (2006.01)
*B60W 60/00* (2020.01)

(52) U.S. Cl.
CPC ...... *B60W 60/0059* (2020.02); *B60W 30/143* (2013.01); *B60W 2556/55* (2020.02)

(58) Field of Classification Search
CPC ........... B60W 60/0059; B60W 30/143; B60W 2556/55
See application file for complete search history.

(56) References Cited

U.S. PATENT DOCUMENTS

| | | | |
|---|---|---|---|
| 2015/0081189 A1* | 3/2015 | Fairgrieve | B60W 30/16 701/96 |
| 2015/0185732 A1* | 7/2015 | Debouk | G05D 1/0055 701/23 |
| 2019/0041850 A1* | 2/2019 | Chase | G08G 1/09675 |

* cited by examiner

*Primary Examiner* — Peter D Nolan
*Assistant Examiner* — Ashley L Redhead, Jr.

(57) ABSTRACT

A vehicle system comprising a plurality of subsystems, each of the plurality of subsystems configured to perform at least a portion of at least one of a plurality of functions. The plurality of functions are organized in a hierarchy of functions including complex higher order functions and simpler lower order functions. The vehicle system further comprises an advanced computing module configured to control the plurality of subsystems in order to perform a higher order function and a lower order function that supports the higher order function. The advanced computing module comprises software instructions including a first gate point. The first gate point may be activated to prevent the advanced computing module from performing the higher order function.

18 Claims, 4 Drawing Sheets

SECURITY SYSTEM AND METHOD FOR DISABLING VEHICLE FUNCTIONS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

Conventional design methods typically consider security and operational risks tied to technologies that are available in vehicles and external infrastructure at the time of the vehicle sale. However, these technologies may not last the life of the vehicle due to being deprecated, operationally flawed, or due to third party operational problems. With respect to a software function, the term "deprecated" typically means that the function may be usable but is regarded as obsolete and best avoided, typically because the software function has been superseded. Conventional means for addressing these obsolete or compromised functions often disable multiple layers of functionality, from relatively simple lower order functions to more complex higher order functions, even though the lower order functions may be unaffected by a security risk that affects only a higher order function.

SUMMARY

The present disclosure describes a system and method that allow a vehicle to maintain the operation of lower order functions while disabling at least one higher order function that depends on the lower order functions, where the higher order function may pose a risk that needs remediation. This disclosure defines a layered system design in which operationally simple or fundamental design sub-systems form the foundation for increasingly complex dependent functions in deeply embedded systems that lack the controls of a file-based operating system to terminate specific processes and the like. These increasingly complex, dependent functions are linked with one or more lower order functions or with one or more input signals via credentialed, control logic application programming interfaces (APIs) referred to herein as "gate points". Strategically assigned gate points align with and enable End of Service (EoS) operations to securely restrict lower order functions from interfacing with the higher order functions or restrict the higher order functions from consuming signal-based dependencies needed to operate. By targeting functional interfaces between functions in this manner, the disclosed system and method provide the ability to isolate and disable more complex operations permitted by the higher-order dependent software components, while maintaining operation of the lower order functions.

In an exemplary embodiment, actively deployed, external instructions using authentication and integrity controls may target any of the deployed gate points to prevent the operation of one or more higher order functions operationally governed by the targeted gate. Since these controls are externally initiated, the instructions may be transmitted widely to a large vehicle population or narrowly to an individual vehicle. By way of example, the disclosed system and method may employ a digitally signed, cryptographic, token-controlled gate point to change an enable condition within an electronic control unit (ECU) module in a vehicle subsystem (e.g., steering control module, brake control module, etc.). The disclosed system and method also may employ a digitally signed, cryptographic, token-controlled gate point to change an enable condition in an advanced computer module, also called a sensor fusion module, such as an electronic object classification module (EOCM) in vehicles so equipped.

In such a case, the gate point may prohibit consumption of a compromised data stream, such as differential GPS data from a cloud service provider (e.g., Trimble® GPS data), which is required for differentially corrected GPS calculations needed for the operation of certain advanced cruise control functions (e.g., true autonomous driving). If a differential GPS server and/or its data stream is compromised, the disclosed system and method may react by wirelessly transmitting a secure EoS request associated with a targeted gate point to disable the advanced cruise control function from being able to consume the tainted differentially corrected GPS data. However, lower order functions, such as full speed range adaptable cruise control and/or basic cruise control, will remain operational.

It is an object of the disclosure to provide a vehicle system comprising: i) a plurality of subsystems, each of the plurality of subsystems configured to perform at least a portion of at least one of a plurality of functions, wherein the plurality of functions are organized in a hierarchy of functions including complex higher order functions and simpler lower order functions. The vehicle system further comprises: ii) an advanced computing module configured to control the plurality of subsystems in order to perform a higher order function and a lower order function that supports the higher order function. The advanced computing module comprises software instructions including a first gate point, wherein the first gate point may be activated to prevent the advanced computing module from performing the higher order function.

In one embodiment, the activation of the first gate point does not prevent the advanced computing module from performing the lower order function.

In another embodiment, the software instructions comprise a kernel program executed by the advanced computing module.

In still another embodiment, the plurality of functions include a basic cruise control mode, a full speed range adaptive cruise control mode, and a semi-autonomous or fully autonomous driving mode.

In yet another embodiment, the semi-autonomous or fully autonomous driving mode comprises the higher order function.

In a further embodiment, the full speed range adaptive cruise control mode comprises the lower order function.

In a still further embodiment, the full speed range adaptive cruise control mode comprises the higher order function.

In a yet further embodiment, the basic cruise control mode comprises the lower order function.

In an embodiment, the vehicle system further comprises a wireless transceiver configured to communicate with a vehicle communication server, wherein the first gate point is activated by a command transmitted by the vehicle communication server to the vehicle.

It is another object of the disclosure to provide a secured system for disabling a function in a vehicle comprising a vehicle communication server configured to communicate with a vehicle via a wireless communication link. The vehicle communication server: i) receives from an external source a security risk alert associated with at least one of a plurality of functions performed by the vehicle, wherein the plurality of functions are organized in a hierarchy of functions including complex higher order functions and simpler lower order functions. The vehicle communication server: ii) identifies a gate point associated with the security risk alert, the gate point associated with software instructions executed by a processor in the vehicle. The vehicle communication server: iii) transmits an instruction to the vehicle, the transmitted instruction operable to activate the gate point, wherein activation of the gate point prevents the processor from performing a higher order function.

In one embodiment, the activation of the gate point does not prevent the processor from performing a lower order function that supports the higher order function.

In another embodiment, the software instructions comprise a kernel program executed by the processor.

In still another embodiment, the plurality of functions include a basic cruise control mode, a full speed range adaptive cruise control mode, and an autonomous driving mode.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1A:
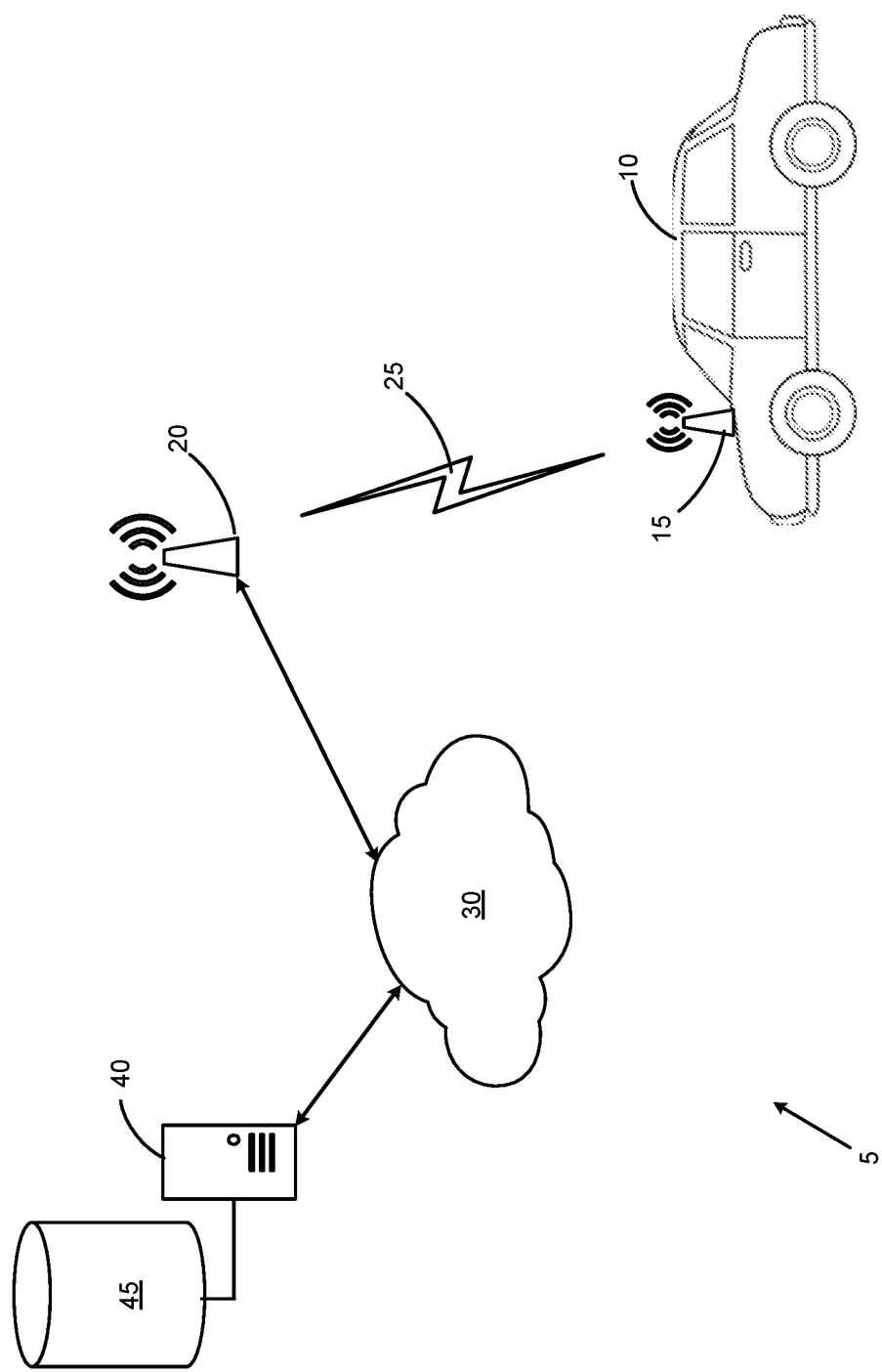
FIG. 1A is an overview of a security system for disabling vehicle functions according to an embodiment of the present disclosure.

The present disclosure describes a secured system and method for deploying secured End of Service (EoS) features that govern the operational lifecycles of classes of fielded features defined by a risk-based assessment of the associated technologies supporting the features. In the scope of a Security Development Life Cycle (SDLC), "End of Service" describes the design requirements, infrastructure and security protocols needed to support the capability to disable vehicle features and/or systems that rely on third party technologies or infrastructure that may become operationally deprecated, unavailable, or pose a risk to operation of a vehicle.

Unlike DRM technologies that govern and enforce the use, distribution and modification of copyrighted materials and proprietary hardware, the disclosed secured system and method allow vehicle systems to maintain the operation of lower order features that support at least one higher order feature, where the higher order feature may pose a risk that needs remediation. Historically, such an action would result in the complete loss of all integrated functionality. However, the disclosed system and method provide strategically implemented, credential-controlled logic that permits vehicle systems to avoid the immediate need for a complete loss of all integrated features or a software re-flash of the vulnerable system(s).

Thus, the disclosed secured system and method permit the vehicle manufacturer to disable operationally high-risk features or those operationally dependent on potentially deprecated services in a manner that prevents any third party entities from disabling or re-enabling them. The disclosed secured system and method maintain the availability of lower order features in a functionally tiered set of highly integrated features by remediating only higher order, high risk, features, or those that are dependent on external infrastructure or contracted services. The disclosed secured system and method allow disabling to be executed in a controlled and timely manner based on safety, cybersecurity, quality, or service (e.g., 2G cellular service deprecation) concerns.

By first identifying the required system elements of high-risk software, third-party services, and/or external infrastructure dependencies, the disclosed secured system and method ensure that each lower order function that contributes to at least one higher order function that supports a vehicle feature may be isolated by a secured gating application programming interface (API), or gate point. The disclosed gate points provide a privileged means to govern operation of the lower order functions that interface with the higher order functions. This creates a capability to disable just the minimum number of functions reliant on one or more high-risk dependencies, while maintaining full operation, or even slightly reduced operation, of lower order functions which support the higher order functions. The disclosed secured system and method also permit the gate point controlling module to re-enable securely the disabled content.

FIG. 1A is an overview of a security system 5 for disabling vehicle functions according to an embodiment of the present disclosure. The security system 5 comprises a vehicle system 10, a vehicle communication server (VCS) 40, and a vehicle, back-office database (DB) 45. The vehicle system 10 includes a wireless access point (AP) 15 that enables the vehicle system 10 to communicate with the VCS 40 via an IP network 30 (e.g., the Internet) and a wireless access point 20. In a typical scenario, the wireless access point 20 is a base station of a cellular network and the wireless access point 15 in the vehicle system 10 is a cellular mobile transceiver.

According to the principles of the present disclosure, the vehicle communication server (VCS) 40 may transmit to the vehicle system 10 instructions that use authentication and integrity protocols to target a gate point in the electronic control unit (ECU) module to prevent the operation of a higher order function that is operationally controlled by the targeted gate point. For example, the VCS 20 may transmit a digitally signed, cryptographic token to the targeted gate point to change an enable condition within a kernel executed by the ECU module. However, lower order functions related to the higher order function will remain operational.

Figure 1B:
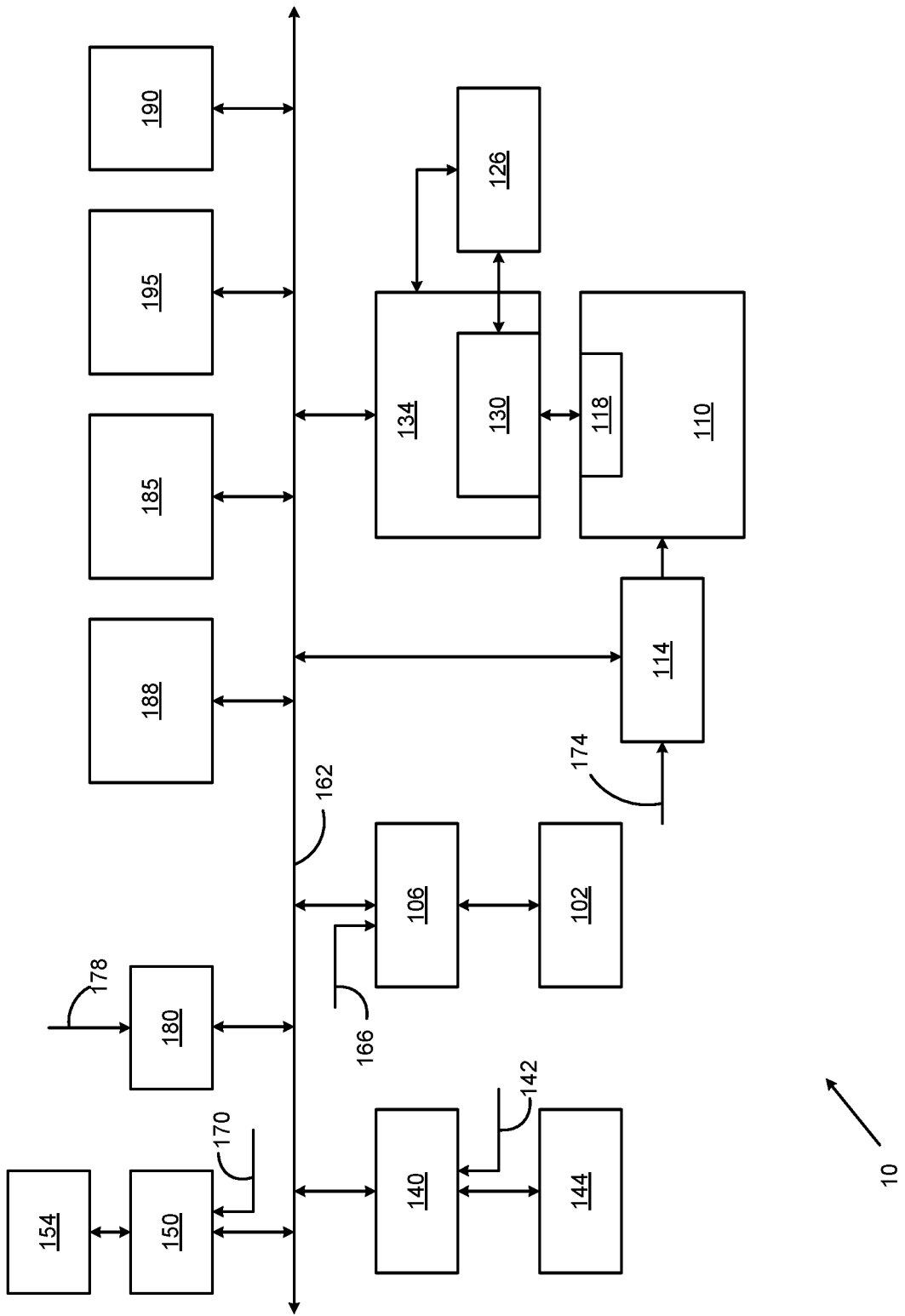
FIG. 1B is a functional block diagram of an exemplary vehicle system that includes a security system for disabling vehicle functions according to the principles of the present disclosure.

FIG. 1B is a functional block diagram of an exemplary vehicle system 10 that implements the security system 5 for disabling vehicle functions according to the principles of the present disclosure. While the present disclosure shows and describes a vehicle system 10 for a hybrid vehicle, the present disclosure is also applicable to non-hybrid vehicles incorporating only an internal combustion engine. While the example of a vehicle is provided, the present application is also applicable to non-automobile implementations, such as boats and aircraft.

An engine 102 combusts an air/fuel mixture to generate drive torque. An engine control module (ECM) 106 controls the engine 102 based on one or more driver inputs. For example, the ECM 106 may control actuation of engine actuators, such as an electronically controlled throttle valve, one or more spark plugs, one or more fuel injectors, valve actuators, camshaft phasers, an exhaust gas recirculation (EGR) valve, one or more intake air-flow boost devices, and other suitable engine actuators.

The engine 102 may output torque to a transmission 110. A transmission control module (TCM) 114 controls operation of the transmission 110. For example, the TCM 114 may control gear selection within the transmission 110 and one or more torque transfer devices (e.g., a torque converter, one or more clutches, etc.).

The vehicle system 10 may include one or more electric motors. For example, an electric motor 118 may be implemented within the transmission 110 as shown in the example of FIG. 1A. An electric motor can act either as a generator or as a motor at a given time. When acting as a generator, an electric motor converts mechanical energy into electrical energy. The electrical energy may charge a battery 126 via a power control device (PCD) 130. When acting as a motor, an electric motor generates torque that supplements or replaces torque output by the engine 102. While the example of one electric motor is provided, the vehicle may include zero or more than one electric motor.

A power inverter control module (PIM) 134 may control the electric motor 118 and the PCD 130. The PCD 130 applies (e.g., direct current) power from the battery 126 to the (e.g., alternating current) electric motor 118 based on signals from the PIM 134, and the PCD 130 provides power output by the electric motor 118, for example, to the battery 126. The PIM 134 may be referred to as a power inverter module (PIM) in various implementations.

A steering control module 140 controls steering/turning of wheels of the vehicle, for example, based on driver turning of a steering wheel within the vehicle and/or steering commands from one or more vehicle control modules. A steering wheel angle sensor (SWA) monitors rotational position of the steering wheel and generates a SWA 142 based on the position of the steering wheel. As an example, the steering control module 140 may control vehicle steering via an EPS motor 144 based on the SWA 142. However, the vehicle may include another type of steering system. An electronic brake control module (EBCM) 150 may selectively control brakes 154 of the vehicle.

Modules of the vehicle may share parameters via a controller area network (CAN) 162. The CAN 162 may also be referred to as a car area network. For example, the CAN 162 may include one or more data buses. Various parameters may be made available by a given control module to other control modules via the CAN 162.

The driver inputs may include, for example, an accelerator pedal position (APP) 166 which may be provided to the ECM 106. A brake pedal position (BPP) 170 may be provided to the EBCM 150. A position 174 of a park, reverse, neutral, drive lever (PRNDL) may be provided to the TCM 114. An ignition state 178 may be provided to a body control module (BCM) 180. For example, the ignition state 178 may be input by a driver via an ignition key, button, or switch. At a given time, the ignition state 178 may be one of off, accessory, run, or crank.

According to an exemplary embodiment of the present disclosure, the vehicle system 10 further comprises an advanced computing module 185, a sensors module 188, a map module 190, and a wireless transceiver (XCVR) module 195. In FIG. 1B, the wireless transceiver module 195 corresponds to the wireless access point 15 in FIG. 1A. The sensors module 188 may include a plurality of sensors that support, for example, basic cruise control, full speed range adaptive cruise control, and/or semi-autonomous or true autonomous driving. These sensors may include, but are not limited to, an on-board GPS receiver, a plurality of radar detectors and a plurality of cameras that detect objects (e.g., other vehicles) proximate the vehicle system 10, a light detection and ranging (LiDAR) system, a wheel speed sensors, a steering wheel angle (SWA) sensor, and the like. Additionally, the wireless transceiver module 195 may receive navigation data from external sources (e.g., ISPs), such as high-definition (HD) map data and differential GPS data. The navigation data received by the wireless transceiver module 195 may be stored in a memory associated with the sensors module 188 and/or with the map module 190.

In vehicle system 10, an embedded microprocessor that executes program instructions in an associated embedded memory controls the operations of each of the electronic vehicle subsystems. Hereafter, the microprocessor and memory in each subsystem may be referred to generically as an electronic control unit (ECU) module. The steering control module 140, the engine control module 106, and the electronic brake control module 150 are all examples of vehicle subsystems. A dedicated embedded ECU module controls each one of these vehicle subsystems.

Each ECU module in a vehicle subsystem executes a kernel program that controls the overall operation of that particular vehicle subsystem in the vehicle system 10. The critical code of the kernel is usually loaded into a separate area of memory protected from access by third party application programs and other less critical parts of the vehicle system 10. According to the principles of the present disclosure, the kernel program executed by each ECU module compromising system elements includes one or more gate points that may disable higher order functions while allowing the ECU module to continue to perform lower order functions.

The advanced computing module 185 comprises a high performance computing platform that controls many of the higher order functions and lower order functions of the vehicle system 10. In a typical implementation, the advanced computing module 185 may be implemented as a microprocessor and an associated memory. Like the ECU modules in the vehicle subsystems, the advanced computing module 185 also executes a kernel program that controls the overall operation of the advanced computing module 185. According to the principles of the present disclosure, the kernel program executed by the advanced computing module 185 includes one or more gate points that may disable higher order functions while allowing the advanced computing module 185 to continue to perform lower order functions.

The advanced computing module 185 receives driver inputs, typically from knobs and switches operated by the driver. By way of example, the advanced computing module 185 may receive a first driver input that activates a conventional (or basic) cruise control mode that maintains a target speed (e.g., 65 MPH) of the vehicle system 10. The advanced computing module 185 also may receive a second driver input that activates a full speed range-adaptive cruise control mode that maintains a target speed of the vehicle system 10, but that also reduces the vehicle speed if the LiDAR system detects that the vehicle system 10 is approaching another vehicle. Finally, the advanced computing module 185 may receive a third driver input that activates an advanced cruise control mode, such as a true autonomous driving mode. In autonomous driving mode, the advanced computing module 185 not only maintains a target speed of the vehicle system 10, but also steers the vehicle system 10 along a path to a destination using GPS data, radar data, camera images, and HD map data.

The advanced computing module 185 is able to implement these various driving modes because the advanced computing module 185 controls and coordinates the operations of the other vehicle subsystems. The advanced computing module 185 consumes information from the sensors module 188 (e.g., wheel speed data, steering wheel angle sensor data, brake status data, LiDAR system data, radar data, camera images, GPS data, etc.) to determine the speed, direction, and location of the vehicle system 10. The advanced computing module 185 uses the consumed information to send commands to, for example, the steering control module 140, the engine control module 106, and the electronic brake control module 150, to control the speed, braking, and/or direction of the vehicle system 10.

Basic cruise control mode is an example of a lower order function. Full speed range adaptive cruise control mode is an example of an intermediate order function. Autonomous driving mode is an example of a higher order function. In basic cruise control mode, for example, the advanced computing module 185 uses the vehicle speed information from the wheel speed sensors to send commands to the engine control module 106 to accelerate or decelerate the vehicle system 10.

In full speed range adaptive cruise control mode, the advanced computing module 185 uses the vehicle speed information and range sensing information from the LiDAR system and/or the radar system to send commands to the engine control module 106 and the electronic brake control module 150. This enables the advanced computing module 185 to control the vehicle speed under normal driving conditions and to apply the brakes if the vehicle system 10 approaches another vehicle or an object too rapidly.

In autonomous driving mode, the advanced computing module 185 uses the vehicle speed information, the range sensing information, GPS data, and steering wheel angle data, among others, to send commands to the engine control module 106, the electronic brake control module 150, and the steering control module 140. This enables the advanced computing module 185 to control the vehicle speed, the brakes and the steering as the vehicle system 10 navigates a route to a destination selected by the driver.

Figure 2:
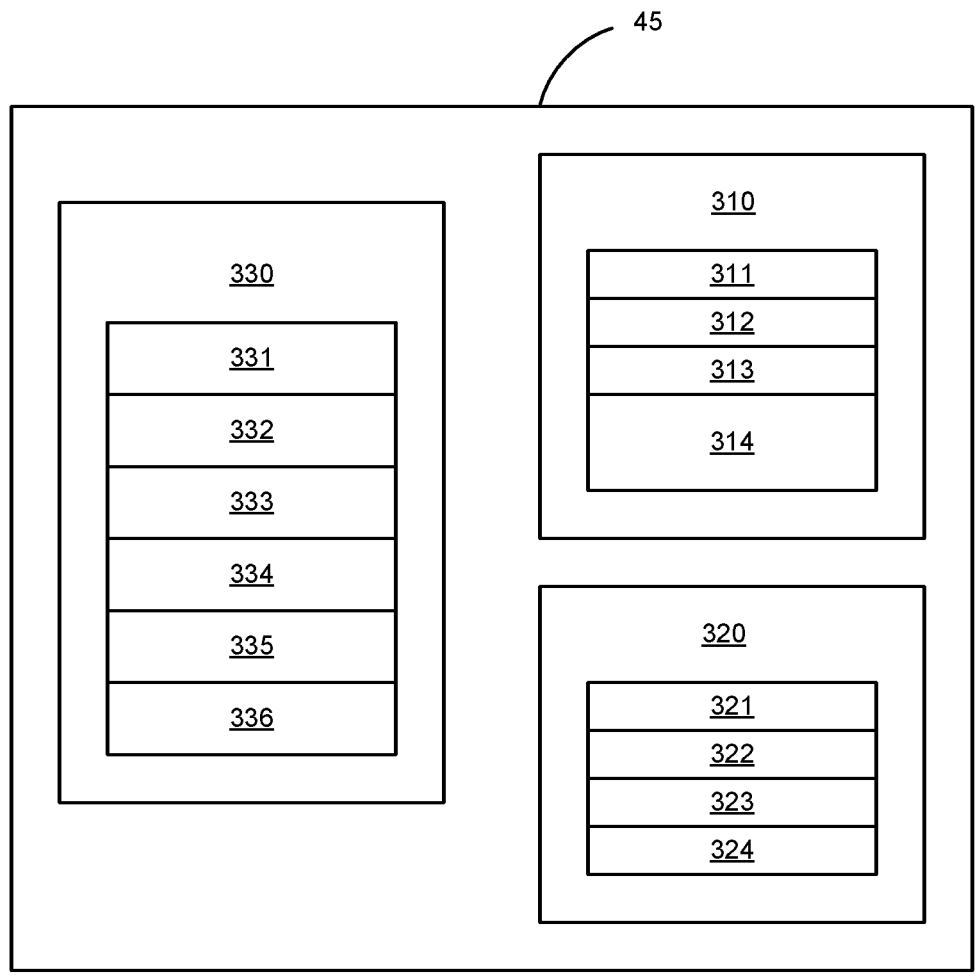
FIG. 2 illustrates an exemplary vehicle database of the security system for disabling vehicle functions according to an embodiment of the present disclosure.

FIG. 2 illustrates an exemplary vehicle database 45 of the security system 5 for disabling vehicle functions according to an embodiment of the present disclosure. The vehicle database 45 comprises, among others, a vehicle records table 310, a vehicle components table 320, and an external infrastructure table 330. The vehicle records table 310 comprises vehicle identification information that enables the VCS 40 to identify vehicles that may be affected by vehicle functions that have been deprecated, are operationally flawed, or are at risk due to third party operational problems.

The individual VIN records 311 comprise the vehicle identification numbers (VINs) of individual owned vehicles and, for each vehicle, a vehicle model and year, a system configuration that includes all relevant technologies embedded in the vehicle (e.g., cruise control modes, anti-theft system, mobile number, and the like). The group VIN records 312 are similar to the individual VIN records 311, but may apply to a group of vehicles, such as vehicles in a certain geographical region or vehicles having a shared year and model type. The fleet VIN records 313 are similar to the individual VINs records 311, but may apply to a group of vehicles that are commonly owned, such as vehicles owned by a large corporate client.

The vehicle functions hierarchy 314 comprises information about related functions for each vehicle system configuration. For a particular system configuration, the vehicle functions hierarchy 314 includes a comprehensive list of functions from highest order functions to lowest order functions and identified gate points in the kernel software of the vehicle system 10 that may selectively disable higher order functions without affecting the execution of lower order functions.

The vehicle components table 310 comprises information about vehicle components that may be affected by vehicle functions that have been deprecated, are operationally flawed, or are at risk due to third party operational problems. The common electrical input/output (CEI) interface (IF) record 321 defines the standards requirements for the electrical interfaces in the vehicle system 10. The ECU hardware record 322 identifies the hardware (e.g., processor, memory) of the ECU module in each vehicle subsystem of the vehicle system 10. The ECU software record 323 identifies the software version of the ECU module in each vehicle subsystem of the vehicle system 10. The wireless AP record 324 identifies the type of the wireless XCVR module 195 of the vehicle system 10. The ECU software and the CEI interface are the components that are at greatest risk of being deprecated, operationally flawed, and/or at risk due to third party issues.

The external infrastructure table 330 comprises information about identified issues or problems related to external infrastructure that the VCS 40 receives and stores in vehicle database 45. The cellular record 331 comprises status information about mobile service providers, such as ATT or Verizon, that transmit wireless data to the wireless transceiver module 195. The Internet service providers (ISPs) record 332 comprises similar status information about the website nodes and addresses of the internet service providers (e.g., Comcast) that may provide data to the vehicle subsystems.

The cloud services record 333 comprises status information associated with cloud services and related data streams from cloud-based providers. For example, the cloud services record 333 may include status information about Google Automotive Services (GAS), which is a set of applications and services that automotive OEMs may license and integrate into in-vehicle infotainment (IVI) systems. Another example of cloud services may include differential GPS data, such as Trimble RDX data.

The content delivery network (CDN) record 334 comprises status information associated with a subset of ISPs that stream data to vehicles, such as Spotify or Akamai. The CDN record 334 may include alerts related to servers that may become compromise and possibly sabotage a codec in the vehicle system 10. The GPS record 335 comprises status information associated with GPS data streams from service providers and may be a subset of cloud services 333. The power grid record 336 comprises status information about the local power grid, including power outages and may be of particular importance to all-electronic vehicles that must be charged from the local power grid.

According to the principles of the present disclosure, the vehicle communication server (VCS) 40 permits the vehicle manufacturer to disable high-risk functions or other functions dependent on potentially deprecated services, while preventing a third party from disabling or re-enabling the functions. Once the VCS 40 becomes aware of an issue related to a higher order or lower order function, the VCS 40 transmits to the vehicle system 10 a gate point instruction that uses authentication and integrity protocols to target a gate point in a specific ECU module of a vehicle subsystem or in the advanced computing module 185. The gate point instruction may prevent the operation of a higher order function controlled by a targeted gate point. Alternatively, the gate point instruction may disable a lower order function as well as all higher order functions that depend on the lower order function. For example, the VCS 20 may transmit a digitally signed, cryptographic token to the targeted gate point to change an enable condition within a kernel executed by an ECU module. However, lower order functions related to the higher order function remain operational.

Figure 3:
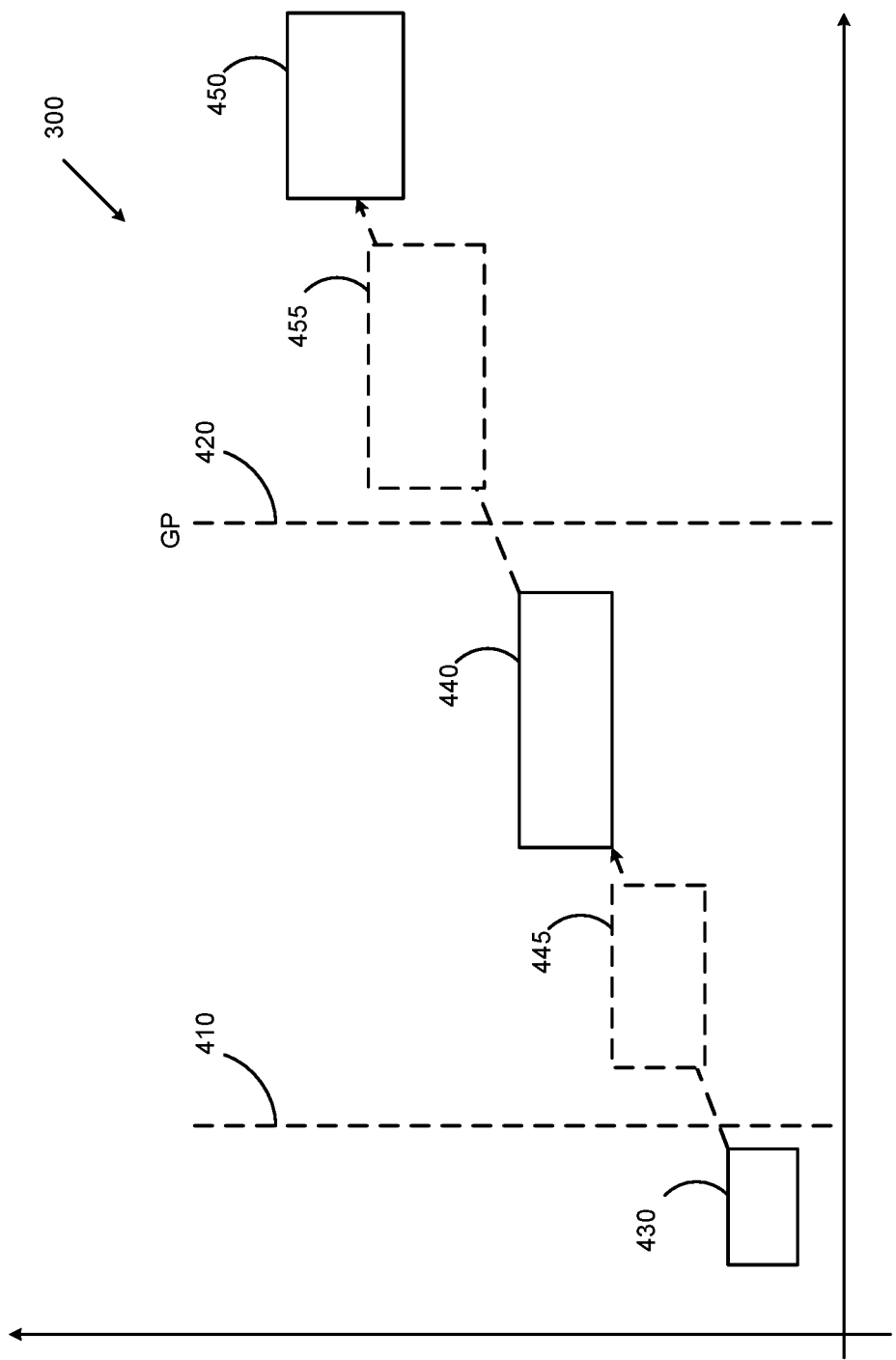
FIG. 3 illustrates an operation in which the security system disables a higher order vehicle function according to an embodiment of the present disclosure.

FIG. 3 illustrates an operation 300 in which the security system 5 disables a higher order vehicle function according to an embodiment of the present disclosure. FIG. 3 illustrates three driving modes: i) cruise control mode 430, ii) full speed range adaptive cruise control mode 440, and iii) true autonomous driving mode 450. Gate point (GP) 410 controls the flow of data 445 (e.g., range sensing data) that enables the vehicle system 10 to move from cruise control mode 430 to full speed range adaptive cruise control mode 440. Gate point (GP) 420 controls the flow of data 455 (e.g., cloud data, map, GPS, radar, cameras, wireless) that enables the vehicle system 10 to move from full speed range adaptive cruise control mode 440 to true autonomous driving mode 450.

In FIG. 3, the VCS server 40 disables the true autonomous driving mode 450. Gate point (GP) 420 represents a secure functional break point that prevents the enablement of true autonomous driving mode. The GP 420 may be implemented in the kernel executed by the advanced computing module 185, thereby preventing the advanced computing module 185 from receiving and using potentially corrupted data or deprecated data from vehicle subsystems, including cloud services data (e.g., differential GPS, map data, GPS data from on-board GPS sensor, radar data, camera images, or other wireless data). This effectively prevents the higher order function, true autonomous driving mode, from launching.

However, the advanced computing module 185 is still capable of launching the lower order functions: i) full speed range adaptive cruise control mode and ii) basic cruise control. Thus, the advanced computing module 185 may still receive the range sensing data from the LiDAR system and/or the radar system. This enables the advanced computing module 185 to send commands to the engine control module 106 and the electronic brake control module 150 in order to launch and operate in full speed range adaptive cruise control mode.

In another example, the VCS server 40 may disable the full speed range adaptive cruise control mode. Gate point (GP) 410 represents a second secure functional break point that prevents the enablement of full speed range adaptive cruise control mode. Again, the GP 410 may be implemented in the kernel executed by the advanced computing module 185, thereby preventing the advanced computing module 185 from receiving and using potentially corrupted data or deprecated data from a range sensing vehicle subsystems (e.g., LiDAR or radar system). This effectively prevents the intermediate order function, full speed range adaptive cruise control mode, from launching. However, the advanced computing module 185 is still capable of launching the lower order function—basic cruise control. Thus, the advanced computing module 185 may still send commands to the engine control module 106 to control the speed of the vehicle system 10.

The above discussion has focused on lower order and higher order functions related to various cruise control and/or autonomous driving modes. However, this is by way of example only and should not be construed to limit the scope of the disclosure. The disclosed system and method may implement gate points in other vehicle subsystems as well. For example, electric vehicles are capable of being charged using personal charging equipment used by the vehicle driver (i.e., home charging equipment) and using commercial charging equipment at public charging stations.

An example of this is plug and charge (PNC) technology. The driver is only required to plug a charging cable into an electric vehicle and a charging station. Once the charging cable plugs into both, the electric vehicle automatically identifies itself to the charging station on behalf of the driver and is authorized to recharge its battery. Unlike earlier systems, the driver is not required to enter a credit card, open a mobile app to scan a QR code, or use an RFID card. However, these older methods are still supported and are referred to as External Identification Means (EIM).

In an exemplary embodiment, the VCS 40 may disable the PNC functions in the vehicle system 10, but still allow the vehicle system 10 to be charged using home charging equipment. The public charging stations rely on certificates and cryptographic technology to charge vehicles. The VCS 40 disables the PNC function for third parties, but the home charger used by the driver.

The disclosed security system and related method supports the use of gate points by the utilization of, for example: i) secure digital identification (DID) writes or digital certificates; ii) signed firmware or DRM methods to enable or disable functions; and iii) electronically driven mechanical interlocks for mitigation of mechanical systems.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed:

1. A vehicle system comprising:
 a plurality of subsystems, each of the plurality of subsystems configured to perform at least a portion of at least one of a plurality of functions, wherein the plurality of functions are organized in a hierarchy of functions including complex higher order functions and simpler lower order functions;
 an advanced computing module configured to control the plurality of subsystems in order to perform a higher order function and a lower order function that supports the higher order function, wherein the advanced computing module comprises software instructions including a gate point, wherein the gate point may be activated to prevent the advanced computing module from performing the higher order function; and
 a wireless transceiver configured to communicate with a vehicle communication server, wherein the gate point is activated by an instruction transmitted by the vehicle communication server to the vehicle, wherein the vehicle communication server transmits the instruction in response to receiving from an external source a security risk alert associated with the gate point.

2. The vehicle system of claim 1, wherein the activation of the gate point does not prevent the advanced computing module from performing the lower order function.

3. The vehicle system of claim 2, wherein the software instructions comprise a kernel program executed by the advanced computing module.

4. The vehicle system of claim 3, wherein the plurality of functions include a basic cruise control mode, a full speed range adaptive cruise control mode, and an autonomous driving mode.

5. The vehicle system of claim 4, wherein the autonomous driving mode comprises the higher order function.

6. The vehicle system of claim 5, wherein the full speed range adaptive cruise control mode comprises the lower order function.

7. The vehicle system of claim 4, wherein the full speed range adaptive cruise control mode comprises the higher order function.

8. The vehicle system of claim 7, wherein the basic cruise control mode comprises the lower order function.

9. A secured system for disabling a function in a vehicle comprising:
a vehicle communication server configured to communicate with a vehicle via a wireless communication link, wherein the vehicle communication server:
receives from an external source a security risk alert associated with at least one of a plurality of functions performed by the vehicle, wherein the plurality of functions are organized in a hierarchy of functions including complex higher order functions and simpler lower order functions;
identifies a gate point associated with the security risk alert, the gate point associated with software instructions executed by a processor in the vehicle; and
transmits an instruction to the vehicle, the transmitted instruction operable to activate the gate point, wherein activation of the gate point prevents the processor from performing a higher order function; and
a plurality of subsystems, each of the plurality of subsystems configured to perform at least a portion of at least one of the plurality of functions;
the processor configured to control the plurality of subsystems in order to perform a higher order function and a lower order function that supports the higher order function;
the software instructions including the gate point; and
a wireless transceiver configured to communicate with the vehicle communication server, wherein the gate point is activated by the instruction transmitted by the vehicle communication server,
wherein the vehicle communication server transmits the instruction in response to receiving from an external source a security risk alert associated with the gate point.

10. The secured system of claim 9, wherein the activation of the gate point does not prevent the processor from performing a lower order function that supports the higher order function.

11. The secured system of claim 10, wherein the software instructions comprise a kernel program executed by the processor.

12. The secured system of claim 11, wherein the plurality of functions include a basic cruise control mode, a full speed range adaptive cruise control mode, and an autonomous driving mode.

13. The secured system of claim 12, wherein the autonomous driving mode comprises the higher order function.

14. The secured system of claim 13, wherein the full speed range adaptive cruise control mode comprises the lower order function.

15. The secured system of claim 12, wherein the full speed range adaptive cruise control mode comprises the higher order function.

16. The secured system of claim 15, wherein the basic cruise control mode comprises the lower order function.

17. A method for disabling a function in a vehicle comprising:
in a vehicle communication server configured to communicate with a vehicle via a wireless communication link:
receiving from an external source a security risk alert associated with at least one of a plurality of functions performed by the vehicle, wherein the plurality of functions are organized in a hierarchy of functions including complex higher order functions and simpler lower order functions;
identifying a gate point associated with the security risk alert, the gate point associated with software instructions executed by a processor in the vehicle; and
transmitting an instruction to the vehicle, the transmitted instruction operable to activate the gate point, wherein activation of the gate point prevents the processor from performing a higher order function;
by a plurality of subsystems, performing at least a portion of at least one of the plurality of functions;
by the processor, controlling the plurality of subsystems in order to perform a higher order function and a lower order function that supports the higher order function;
by a wireless transceiver, communicating with the vehicle communication server and receiving the instruction; and
activating the gate point by the instruction transmitted by the vehicle communication server,
wherein the vehicle communication server transmits the instruction in response to receiving from an external source a security risk alert associated with the gate point.

18. The method of claim 17, wherein activation of the gate point does not prevent the processor from performing a lower order function that supports the higher order function.

* * * * *